Patented Sept. 17, 1946

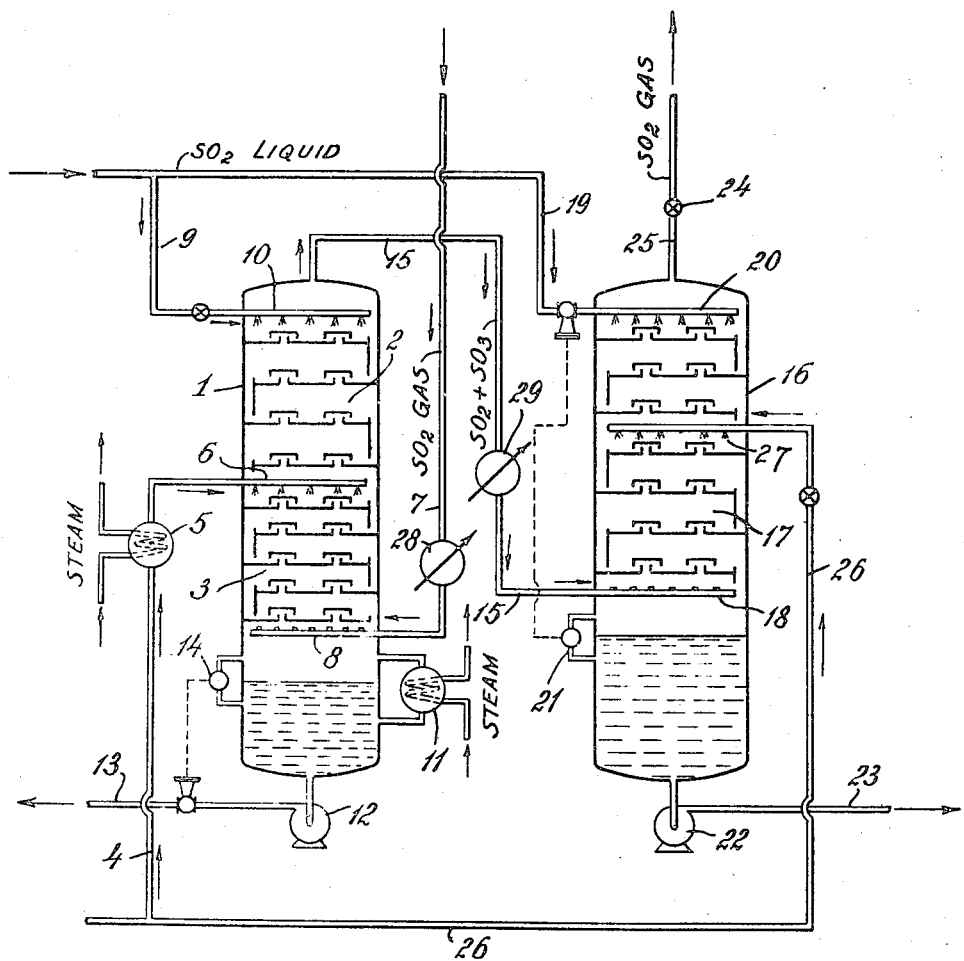

2,407,822

UNITED STATES PATENT OFFICE 2,407,822

METHOD FOR MAKING ACID REAGENTS

Frank C. Fahnestock, Haddonfield, N. J., and William A. Hagerbaumer, Haverford Township, Delaware County, Pa., assignors to Socony-Vacuum Oil Company, Incorporated, a corporation of New York Application December 14, 1943, Serial No. 514,222

3 Claims. (Cl. 23—177)

This invention has to do with the making of various acid reagents utilizing the oxides of sulfur.

For example, in sulfonation processes, it is frequently desired to use solutions of sulfur trioxide in liquid sulfur dioxide, or oleum of quite high concentration.

This invention is directed to a convenient and highly efficient method for handling the preparation of many such reagents.

The invention may be understood by reference to the attached drawing, the single figure of which shows, in diagram form, apparatus appropriate to carrying out the invention, which may be operated as follows:

Turning to the drawing, 1 is a stripper tower, having a fractionating section 2 and an exhausting section 3. An oleum, say one containing 20% $SO_3$ is fed to this tower through pipe 4, passing through heater 5 and entering the tower through spray 6. The function of this tower is to strip $SO_3$ from the oleum, and to this end there is introduced, by pipe 7 and spray 8, a stream of vaporous sulfur dioxide. This stream of gas may be heated in heater 28. Control of tower conditions is effected in the usual manner by a wet reflux of liquid sulfur dioxide, introduced from pipe 9 through spray 10. Additional heat, as necessary, may be supplied by reboiler 11. Operating in this fashion, an oleum may be stripped readily to a low concentration, say for example to one containing 3% $SO_3$, which denuded oleum may be removed from tower 1 through pump 12 and pipe 13, under the control of liquid level valve 14. The overhead product of stripping tower 1, departing through pipe 15, consists of a gaseous mixture of $SO_2$ and $SO_3$.

Instead of the fractionator type of equipment shown, other types of stripper may be used, as, for example, a film type of evaporator.

This mixture is introduced into absorber tower 16, below its packing 17, through spray 18, having first been cooled by passing through cooler 29. Liquid $SO_2$ is introduced at the top of tower 16 from pipe 19, through spray 20, in amounts which may be controlled by liquid level control valve 21, or otherwise, if desired. There is collected in the bottom of tower 16 a liquid $SO_2$ containing dissolved $SO_3$, which may be withdrawn for use through pump 22 and pipe 23. Control of conditions within the absorber tower may be effected in several ways, as by control of the temperature of the entering liquid $SO_2$, and by pressure control effected through the agency of valve 24 on $SO_2$ gas vent pipe 25 as a modifier of system pressure. Working in this fashion, any desired mixture of liquid sulfur dioxide and dissolved sulfur trioxide can be achieved.

Instead of the fractionator type of absorber shown, other types of equipment useful for the absorption of gases in liquids may be used.

Working in another way, the operation can be utilized for the producing of strong oleum from relatively weaker oleum. Still introducing 20% oleum through pipe 4 to the stripper 1 and denuding it of sulfur trioxide to produce a denuded 3% oleum, the 20% oleum may be introduced into absorber 16 through pipe 26 and spray 27. In this operation, under control of absorber conditions effected in the usual manner by the temperature of the entering oleum and system pressure as effected by control of gas vent 24, any desired strength of oleum can be produced by controlled absorption of sulfur trioxide.

It will also be possible, operating in this way, for purposes where its use is desirable, as in some sulfonation operations, to produce mixtures of oleum and liquid sulfur dioxide.

As an example of the operation, working in tower 1 at a feed temperature of 225° F. and a pressure of 2 lb. gauge with a bottom temperature of 250° F., a 15% oleum may be stripped to a 3% oleum. The stripper overhead may then be treated in absorber 16 at atmospheric pressure and a temperature of 15–20° F. to produce a liquid consisting of 80% by weight of sulfur dioxide and 20% by weight of sulfur trioxide. If oleum is used as the absorption agent, to produce a stronger oleum, the working temperature of the absorber will usually be about 40° F. or less, at atmospheric pressure.

Quite obviously, the method may also be used for the strengthening of sulfuric acid of low concentration, such as for raising the concentration of a 66° Baumé acid by solution of sulfur trioxide therein, and for similar operations.

We claim:

1. That method of handling acidic oxygen products of sulfur comprising contacting an oleum containing dissolved sulfur trioxide with gaseous sulfur dioxide under temperature and pressure conditions conducive to evaporation of sulfur trioxide from oleum to produce a gaseous mixture of sulfur dioxide and trioxide and then in a separate region contacting said gaseous mixture with a liquid absorbent for said sulfur trioxide selected from the group consisting of liquid oxides of sulfur and hydrates of sulfuric anhydride to absorb sulfur trioxide therein.

2. The method of claim 1 in which the liquid absorbent used is liquid sulfur dioxide and the product is liquid sulfur dioxide containing dissolved sulfur trioxide.

3. The method of claim 1 in which the liquid absorbent used is an oleum and the product is a stronger oleum.

FRANK C. FAHNESTOCK.
WILLIAM A. HAGERBAUMER.